March 24, 1970 HIROSHI IKEUCHI 3,502,938
DISTORTION CORRECTING DEVICES FOR MAGNETIC DEFLECTING DEVICES
Filed Feb. 3, 1969 2 Sheets-Sheet 1

HIROSHI IKEUCHI *INVENTOR*

BY Cheeks, Ogud, Birch, Samuels & Gauthier
ATTORNEY

HIROSHI IKEUCHI INVENTOR

BY Cutler, Pfund, Birch, Samuels & Gauthier
ATTORNEY

United States Patent Office 3,502,938

Patented Mar. 24, 1970

3,502,938

DISTORTION CORRECTING DEVICES FOR MAGNETIC DEFLECTING DEVICES

Hiroshi Ikeuchi, Tokyo, Japan, assignor to Denki Onkyo Co., Ltd., Tokyo, Japan, a corporation of Japan Filed Feb. 3, 1969, Ser. No. 796,010
Claims priority, application Japan, Feb. 5, 1968, 43/7,014
Int. Cl. H01j *29/70*
U.S. Cl. 315—24 4 Claims

ABSTRACT OF THE DISCLOSURE

A distortion correcting device for magnetic deflecting devices comprises a magnetic core in the form of a cubic Wheatstone bridge, a pair of coils respectively wound upon diagonal magnetic members of the bridge, means to supply a horizontal deflection current components to one of the coils and means to supply a vertical deflection current component to the other.

BACKGROUND OF THE INVENTION

This invention relates to a cathode ray tube apparatus wherein an electron beam is subjected to magnetic fields in vertical and horizontal directions to cause it to scan across a fluorescent screen of the cathode ray tube and more particularly to a distortion correcting device adapted to correct the so-called bobbin shaped distortion of the raster whereby to describe an equilateral rectangular raster on the fluorescent screen.

For example, in a television receiver, an electron beam emanated from an electron gun of an image receiving tube is subjected to electromagnetic deflecting fields in vertical and horizontal directions produced by a switchable electromagnetic deflector means to describe generally rectangular raster on the fluorescent screen of the image receiving tube. Although it is necessary to describe an equilateral rectangular raster on the fluorescent screen, as is well known in the art, when deflecting the electron beam by means of an electromagnetic device over a wide angle along the fluorescent screen it is necessary to make uniform as far as possible the magnetic field distribution with respect to the electron beam in order to prevent distortion of the beam spot or variation of the beam focus. This problem is more serious in an image receiving tube for color televisions where it is necessary to concentrate three electron beams for three colors. However, when such a uniform magnetic field distribution is used to deflect and scan the electron beam the raster becomes to assume a bobbin shape instead of an equilateral rectangle.

In order to describe an equilateral rectangle with a uniform magnetic field distribution by correcting the bobbin shaped distortion it has been proposed to apply to the electromagnetic deflecting device a vertical deflection current $I_V$ and a horizontal deflection current $I_H$ represented by FIGS. 1A and 1B respectively. More particularly, to produce the vertical deflection current $I_V$, a saw tooth vertical deflection current is modulated by a horizontal component having a horizontal deflection period of $T_H$ so that the vertical deflection current corresponds to a superposition of a horizontal scanning frequency signal $S_H$ with an amplitude gradually decreasing toward the center O of the picture and a saw tooth vertical deflection current as shown in FIG. 1A and to produce the horizontal deflection current $I_H$, the horizontal deflection current is modulated during the vertical deflection period $T_V$ so as to produce a wave having an amplitude gradually decreasing toward the center O to the picture as shown in FIG. 1B.

In the past, although various methods and devices have been proposed to obtain such vertical and horizontal deflection currents $I_V$ and $I_H$, all of them are complicated and expensive.

SUMMARY OF THE INVENTION

It is therefore an object of this invention to provide a simple and effective distortion correcting device for magnetic deflection devices.

According to this invention there is provided a distortion correcting device comprising a magnetic core in the form of a cubic Wheatstone bridge, a pair of coils respectively wound upon diagonal magnetic members of said bridge, means to supply a horizontal deflection current component to one of said coils and means to supply a vertical deflection current component to the other.

BRIEF DESCRIPTION OF THE DRAWING

In the accompanying drawing:

FIG. 1 shows current waveforms necessary for correcting bobbin shaped distortion in which FIG. 1A shows a waveform of the vertical deflection current while

FIGS. 2 and 3 are diagrams to explain the operation of the novel distortion correcting device in which FIG. 2 shows the basic construction of a magnetic core of a cubic Wheatstone bridge configuration and FIG. 3 shows an electrical equivalent circuit of the magnetic core shown in FIG. 2;

DESCRIPTION OF THE PREFERRED EMBODIMENTS

Figure 2:
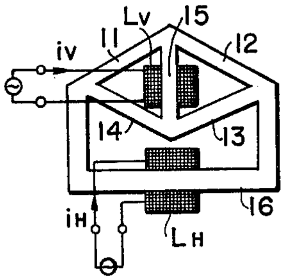

FIG. 2 illustrates the basic construction of the magnetic core of this invention. The magnetic core shown therein includes four arms 11, 12, 13 and 14 which are arranged in a bridge configuration and two diagonal or bridging magnetic legs 15 and 16. A coil $L_V$ carrying the horizontal deflection current component $i_H$ is wound upon leg 16.

In this manner, four arms 11, 12, 13 and 14 and two diagonal legs 15 and 16 cooperate to comprise a cubic Wheatstone bridge. The term "a magnetic core in the form of a cubic Wheatstone bridge" is used herein to mean a magnetic core having a rectangular core including four arms and two diagonal magnetic members. Various forms of the magnetic core are shown in FIG. 8 as will be described later in more detail. As the magnetic material any one of many soft magnetic materials, such as pure iron, is preferred which has a B–H curve wherein the increment of the magnetic flux density B gradually decreases toward saturation as the magnetization force H increases.

Figure 3:
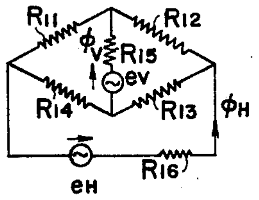

The operation of the magnetic core shown in FIG. 2 will now be considered with reference to FIG. 3. $R_{11}$, $R_{12}$, $R_{13}$, $R_{14}$, $R_{15}$ and $R_{16}$ designate respective equivalent reluctances of various arms and legs represented by suffixes, $l_V$ and $l_H$ represent equivalent magnetic forces established by coils $L_V$ and $L_H$ respectively, $\phi V$ and $\phi H$ represent magnetic fluxes created by coils $L_V$ and $L_H$ respectively. In this regard, the equivalent reluctance of a magnetic core corresponds to a non-linear resistance of the core manifested by its B–H curve so that the reluctance increase as the flux passing through the core increases.

The percentage of the reluctance which increases with the flux can be selected in a wide range by suitably proportioning the cross-sectional area of the magnetic core. More particularly, in an excitation region wherein variation of the reluctance is not desirable, the cross-sectional area of the core is selected to be large whereas in regions wherein large variation of the reluctance is advantageous the cross-selectional area is selected to be small. Alternatively, the quality of the magnetic core may be varied.

This invention is based on a unique utilization of the non-linearity provided by the B–H curve of four arms 11, 12, 13 and 14 of the bridge. For this reason, diagonal magnetic members 15 and 16 are preferable to be made of a magnetic material of low reluctance. Thus, the configuration as well as dimensions of the magnetic core should be determined by taking into consideration these factors. For this reason, in the following theoretical consideration equivalent reluctances $R_{15}$ and $R_{16}$ are neglected because they do not contain any variable terms.

Figure 1A:
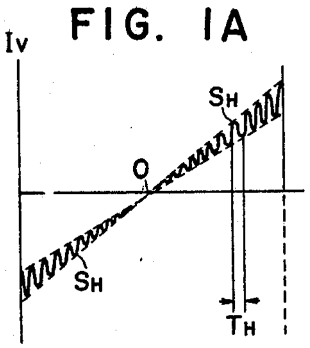

For the sake of simplicity, it is now assumed that four arms of the bridge have equal cross-sectional area and length. Then, where equivalent magnetomotive forces $1_V$ and $1_H$ have polarities as shown in FIG. 3, flux $\phi H$ will pass through leg 15 because $R_{12}$ and $R_{14}$ are smaller than equivalent reluctances $R_{11}$ and $R_{13}$. The quantity of the flux passing through leg 15 increases as fluxes $\phi H$ and $\phi V$ increase. Consequently, a voltage induced in coil $L_V$ on leg 15 increases with the increase of fluxes $\phi H$ and $\phi V$ so that by passing a current having a period of the horizontal deflection through coil $L_H$ a vertical deflection current having a period of the horizontal deflection through coil $L_H$ a vertical deflection current having a waveform shown in FIG. 1A can be obtained.

The inductance $Lh$ of coil $L_H$ can be expressed by $$Lh=\frac{N^2}{R_O}$$

where N represents the number of turns of the coil and $$R_O=\frac{R_{11}\cdot R_{14}}{R_{11}+R_{14}}+\frac{R_{12}\cdot R_{13}}{R_{12}+R_{13}}$$

As above described since $R_{11}=R_{12}=R_{13}=R_{14}=R_C$ it is possible to consider $R_O=R_C$.

Figure 4A:
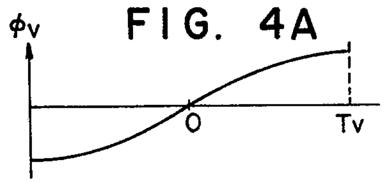
FIG. 4 shows characteristic curves to help understanding of the principle of this invention in which A shows a characteristic curve to represent variation in the magnetomotive force of a magnetic core wound with a vertical current coil $L_V$ with respect to the vertical deflection period, B a characteristic curve showing the variation in the inductance of a horizontal current coil L with respect to the vertical deflection period and C a characteristic curve showing the variation in the current flowing through a horizontal current coil $L_H$ with respect to the vertical deflection period.
Figure 4B:
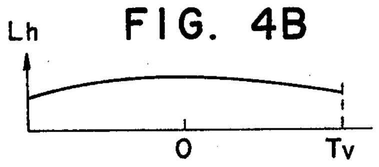
Figure 4C:
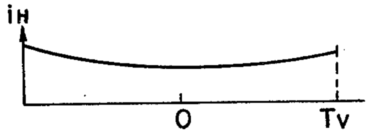

Thus, $Lh$ has a tendency to become smaller because $R_C$ is caused to increase by the increase of fluxes $\phi V$ and $\phi H$, thus becoming largest at the center of the vertical deflection period. This relation is shown in FIG. 4 in which FIG. 4A shows the relationship between vertical deflection period $T_V$ and $\phi V$, FIG. 4B that between vertical deflection period $T_V$ and $Lh$ and FIG. 4C that between vertical deflection period $T_V$ and $i_H$.

Figure 1B:
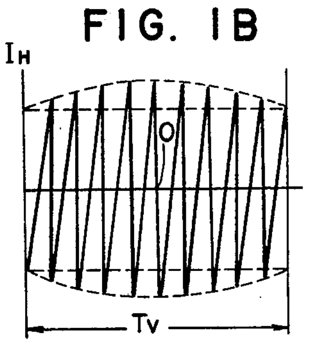
FIG. 1B shows a waveform of the horizontal deflection current.
Figure 5:
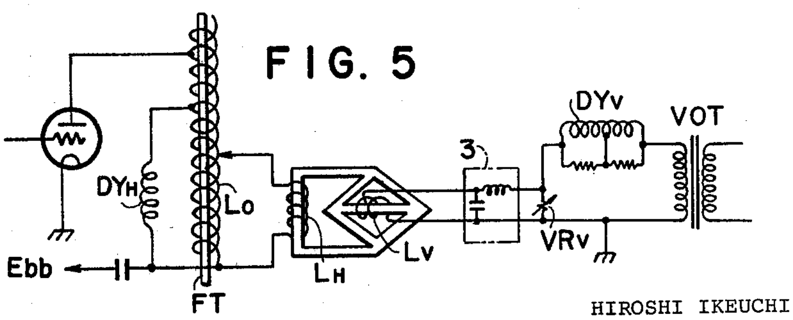
FIG. 5 shows a connection diagram of one example of the novel deflection distortion correcting device.

If, as shown in FIG. 5, the output winding $L_0$ of a flyback transformer FT of a television receiver is tapped down and a coil $L_H$ passing the horizontal deflection current component $i_H$ is connected substantially in parallel with output winding $L_0$ the current flowing through the horizontal deflection coil $DY_H$ will be reduced by an amount corresponding to a component (see FIG. 4C) of the current $i_H$ flowing through coil $L_H$, thus obtaining a horizontal deflection current waveform shown in FIG. 1B. In FIG. 5 VOT represents a vertical deflection output transformer, $DY_V$ a vertical deflection coil and 3 a waveform shaping circuit comprising a resonance circuit and the like for obtaining a waveform analogous to a parabola. In the shaping circuit 3 a capacitance is connected in parallel with coil $L_V$ $L_O$ tuned at the horizontal deflection frequency to shape the horizontal deflection current component (saw tooth wave) induced in coil $L_V$ into a sine wave which approximates a parabola wave. A reactance connected in series with coil $L_V$ functions to adjust the phase of the vertical deflection current so that the vertical deflection current becomes zero at the center of the picture. Adjustment of the current flowing through coil $L_H$ may be made by either adjusting the position of a tap of the output winding $L_O$ of flyback transformer FT or by connecting a suitable variable shunt resistor across coil $L_H$. Similarly, the current flowing through coil $L_V$ may be adjusted by connecting a suitable variable shunt resistor across coil $L_V$ such as a variable resistor $VR_V$ shown in FIG. 5.

Figure 6:
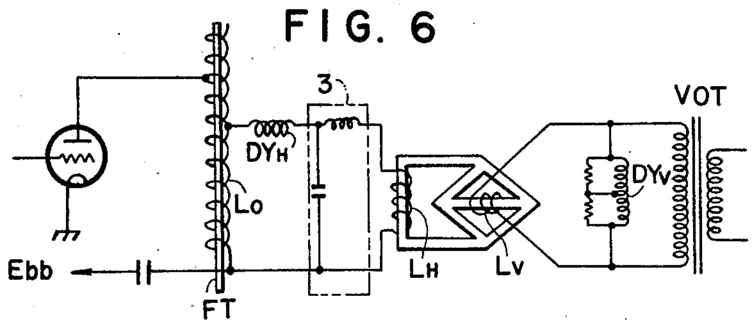
FIG. 6 shows a connection diagram of a modified embodiment.

FIG. 6 illustrates a modified embodiment of this invention wherein a horizontal deflection coil $DY_H$ is connected in series with a coil $L_H$ passing the horizontal deflection current component, through a waveform shaping circuit 3 and wherein a vertical deflection coil $DY_V$ is connected in series with a coil $L_V$ through which the vertical deflection current component flows. This embodiment operates in the same manner as the first embodiment.

Figure 7:
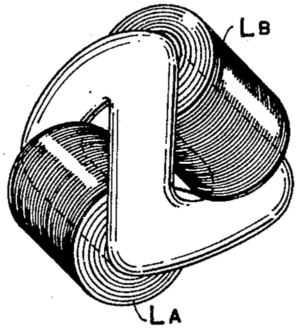
FIG. 7 is a perspective view of a magnetic core of the cubic Wheatstone bridge configuration.
Figure 8A:
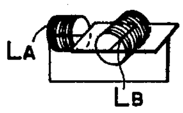
FIGS. 8A through 8G are diagrammatic representations of various forms of the magnetic core when the core shown in FIG. 7 is developed phase geometrically.
Figure 8B:
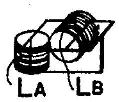
Figure 8C:
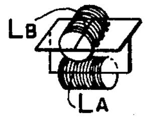
Figure 8D:
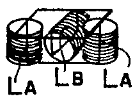
Figure 8E:
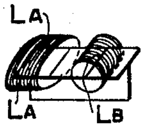
Figure 8F:
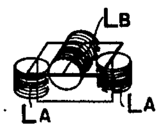
Figure 8G:
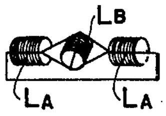

FIG. 7 shows a perspective view of the magnetic core of the cubic Wheatstone bridge configuration. More specifically, a magnetic core is disposed to abut against each one of six sides of a tetrahedron, and a pair of coils $L_A$ and $L_B$ are mounted upon opposing cores. When developed phase geometrically this structure, various forms are obtained, as schematically shown in FIG. 8A through FIG. 8G, wherein letters $L_A$ and $L_B$ show portions upon which coils are to be wound. In the construction shown in FIG. 7, it is difficult not only to assemble the core but also to form split joints so that the form is not always stable. Further, the space factor is not excellent. However, constructions shown in FIG. 8 are advantageous because they can be readily fabricated by standard ferrite cores of letters E, I, and U configurations which have been standardized for use as core elements of transformers.

While the invention has been shown and described in terms of its preferred embodiment it should be understood that the invention is by no means limited thereto but many changes and modifications will be obvious to one skilled in the art within the true spirit and scope of the invention as defined in the appended claims.

What is claimed is:

1. A distortion correcting device comprising a magnetic core in the form of a cubic Wheatstone bridge, a pair of coils respectively wound upon diagonal magnetic members of said bridge, means to supply a horizontal deflection current component to one of said coils and means to supply a vertical deflection current component to the other.

2. The distortion correcting device according to claim 1 wherein one of said coils is converted substantially in parallel with one of two coils which produce orthogonal magnetic fields acting upon an electron beam of a cathode ray tube, and the other deflecting coil is connected substantially in series with the other of said coils on said diagonal magnetic members.

3. The distortion correcting device according to claim 1 wherein one of said coils on the magnetic core and one of the deflection coils are connected in parallel with the output winding of a flyback transformer of a cathode ray tube apparatus and the other of said coils on said magnetic core is connected in series with the other of said deflection coils through a waveform shaping circuit for obtaining a waveform analogous to a parabola.

4. The distortion correcting apparatus according to claim 1 wherein in parallel with an output winding of a flyback transformer are connected one of said deflection coils and one of said coils on the magnetic core, the latter being connected via said waveform shaping circuit and wherein the other of said coils on the magnetic core is connected in parallel with the other of said deflection coil.

No references cited.

RODNEY D. BENNETT, Jr., Primary Examiner

J. G. BAXTER, Assistant Examiner

U.S. Cl. X.R.

315—27

PO-1050
(5/69)

UNITED STATES PATENT OFFICE
CERTIFICATE OF CORRECTION

Patent No. 3,502,938 Dated March 24, 1970

Inventor(s) Hiroshi Ikeuchi

It is certified that error appears in the above-identified patent and that said Letters Patent are hereby corrected as shown below:

column 2, line 37, "L" should be --$L_H$--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,502,938 Dated March 24, 1970

Inventor(s) Hiroshi Ikeuchi

It is certified that error appears in the above-identified patent and that said Letters Patent are hereby corrected as shown below:

column 2, line 37, "L" should be --$L_H$--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents